United States Patent
Chen et al.

(10) Patent No.: US 8,312,467 B2
(45) Date of Patent: Nov. 13, 2012

(54) METHOD AND SYSTEM FOR CONCURRENTLY EXECUTING AN APPLICATION

(75) Inventors: Liang T. Chen, Saratoga, CA (US);
Yuan Lin, Cupertino, CA (US);
Deepankar Bairagi, Marina, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1200 days.

(21) Appl. No.: 12/120,193

(22) Filed: May 13, 2008

(65) Prior Publication Data

US 2009/0288097 A1 Nov. 19, 2009

(51) Int. Cl.
*G06F 9/46* (2006.01)
(52) U.S. Cl. ........................................ 718/107
(58) Field of Classification Search .................... 718/107
See application file for complete search history.

(56) References Cited

U.S. PATENT DOCUMENTS

| | | | | |
|---|---|---|---|---|
| 5,136,712 A | * | 8/1992 | Perazzoli et al. | 718/104 |
| 2003/0236815 A1 | * | 12/2003 | Brenner et al. | 709/104 |
| 2005/0125645 A1 | * | 6/2005 | Rudd et al. | 712/239 |

* cited by examiner

*Primary Examiner* — Mengyao Zhe
(74) *Attorney, Agent, or Firm* — Osha Liang LLP

(57) ABSTRACT

A method for executing an application, that includes instantiating, by a first thread, a first executable object and a second executable object, creating a first processing unit and a second processing unit, instantiating an executable container object, spawning a second thread, associating the first executable object and the second executable object with the executable container object, processing the executable container object to generate a result, and storing the result. Processing the executable container object includes associating the first executable object with the first processing unit, and associating the second executable object with the second processing unit, wherein the first thread processes executable objects associated with the first processing unit, wherein the second thread processes executable objects associated with the second processing unit, and wherein the first thread and the second thread execute concurrently.

20 Claims, 10 Drawing Sheets

METHOD AND SYSTEM FOR CONCURRENTLY EXECUTING AN APPLICATION

BACKGROUND

A typical computer system includes hardware and software. The hardware includes at least one processing device that executes instructions defined by the software (i.e., an application). The processing device may be a processor, a micro-core on a multi-core processor, or other such device that can process instructions. Often a computer system may include multiple processing devices that execute the applications in parallel. For example, multiple processors and/or multiple micro-cores may execute in parallel. Parallel execution can often shorten the amount of time required to process the instructions of the application. Thus, parallel applications, or applications developed to be executed in parallel, tend to execute faster than applications, which execute serially.

Parallel applications also tend to be more complicated than serial applications. Specifically, a single thread in a serial application does not compete with other threads of the same application to modify and/or read data in memory. In contrast, in a parallel application, multiple threads executing the same application may attempt to modify and read data at different unknown times. Thus, in a parallel application, the value of data in memory may be dependent on the order at which each thread reads the data and writes to the data.

For example, consider the scenario in which thread X needs to add 20 to the value at data element E and thread Y needs to subtract 5 from the value at data element E, where the initial value of data element E is 40. In the first step, thread X reads the value of data element E (i.e., 40). In the second step, thread X adds twenty to the value read for data element E (i.e., 40+20=60). Concurrently with the second step, thread Y reads the value of data element E (i.e., 40). In the third step, thread X stores 60 as the value of data element E. Also, thread Y subtracts 5 from the value thread Y read (i.e., 40−5=35). In the fourth step, thread Y stores 35 as the value of data element E. Thus, the result of this execution is the final value of data element E is 35 rather than the correct value of 55 (i.e., 40+20−5=55).

Thus, the developer must typically be cognizant of the different dependencies and develop the parallel application accordingly. In general, the developer develops the application by creating source code defining the application. Source code is a collection of instructions written in any human-readable programming language. In the source code, the developer defines the number of threads that will execute the application. Further, the developer defines which portion of the parallel application is executed in parallel. The developer defines the disjoint portion of data processed by each thread to generate results. The developer may also define how the different threads communicate and combine the generated results.

Once written, the source code may be compiled to create executable code. Executable code is a collection of instructions understandable by a computer. When the executable code of the parallel application is executed, the threads are generated and executed by the different processing devices according to the instructions defined by the developer.

SUMMARY

In general, in one aspect, the invention relates to a method for executing an application, that includes instantiating, by a first thread, a first executable object and a second executable object, creating a first processing unit and a second processing unit, instantiating an executable container object, spawning a second thread, associating the first executable object and the second executable object with the executable container object, processing the executable container object to generate a result, and storing the result. Processing the executable container object includes associating the first executable object with the first processing unit, and associating the second executable object with the second processing unit, wherein the first thread processes executable objects associated with the first processing unit, wherein the second thread processes executable objects associated with the second processing unit, and wherein the first thread and the second thread execute concurrently.

In general, in one aspect, the invention relates to a method for executing an application, that includes instantiating, by a first thread, a first executable object, instantiating an executable container object, creating a first processing unit and a second processing unit, spawning a second thread, associating the first executable object with the executable container object, processing the executable container object to generate a result, and storing the result. Processing the executable container object includes associating the first executable object with the first processing unit, generating, during the processing of the first executable object, the second executable object, and associating the second executable object with the second processing unit, wherein the first thread processes executable objects associated with the first processing unit, wherein the second thread processes executable objects associated with the second processing unit, and wherein the first thread and the second thread execute concurrently.

In general, in one aspect, the invention relates to a computer readable medium that includes computer readable program code embodied therein for causing a computer system to execute an application by instantiating, by a first thread, a first executable object and a second executable object, creating a first processing unit and a second processing unit, instantiating an executable container object, spawning a second thread, associating the first executable object and the second executable object with the executable container object, processing the executable container object to generate a result, and storing the result. Processing the executable container object includes associating the first executable object with the first processing unit, and associating the second executable object with the second processing unit, wherein the first thread processes executable objects associated with the first processing unit, wherein the second thread processes executable objects associated with the second processing unit, and wherein the first thread and the second thread execute concurrently.

Other aspects of the invention will be apparent from the following description and the appended claims.

DETAILED DESCRIPTION

Figure 1:
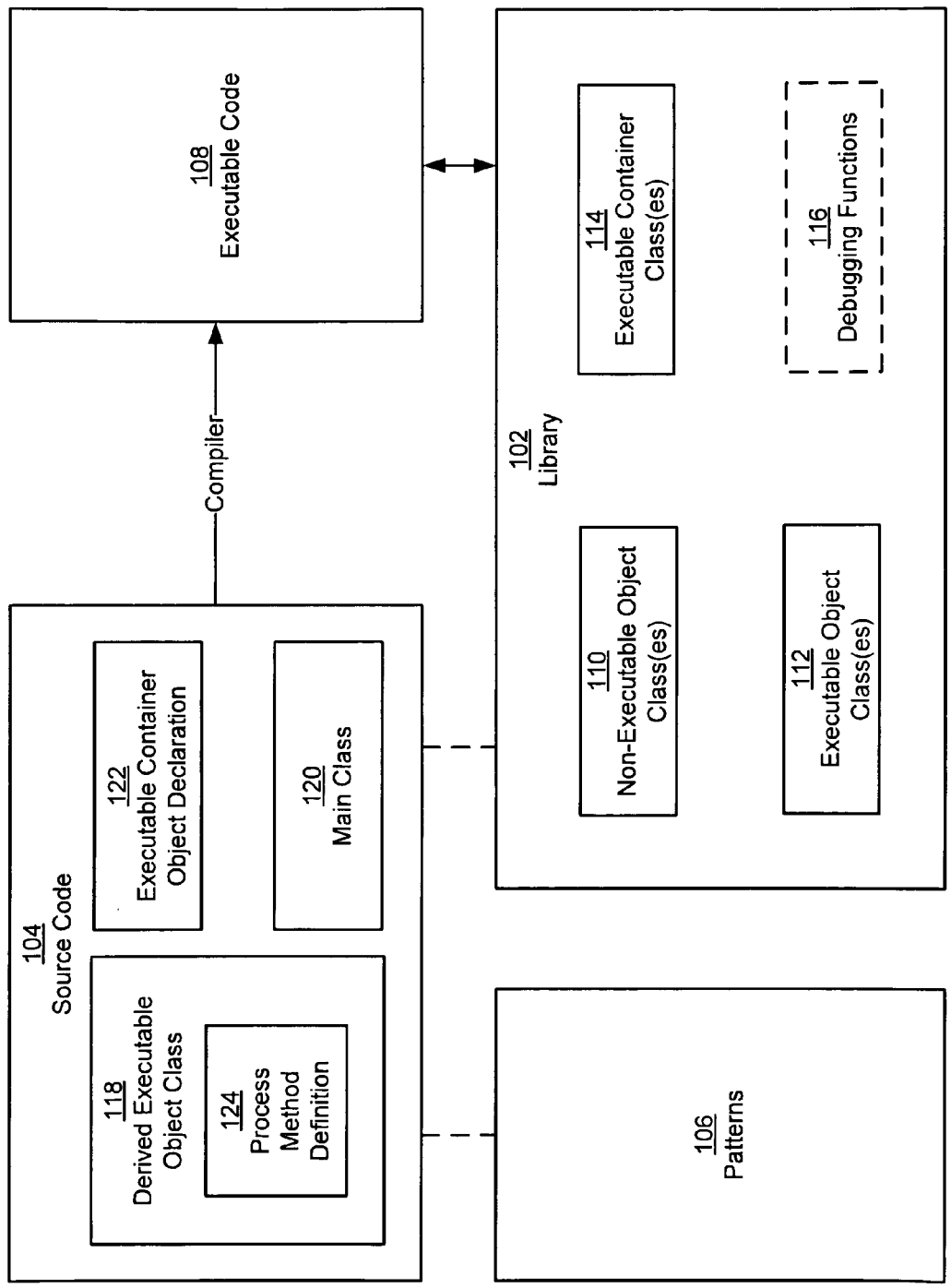
FIGS. 1 and 2 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for creating and executing an application. Specifically, embodiments of the invention include statements in the source code to instantiate an executable container object and to instantiate multiple executable objects. The executable objects are added to the executable container object. The executable container object includes instructions for initiating the processing of the executable objects. Executable objects in the executable container may be executed concurrently by different threads. For example, one thread may process one of the executable objects in the executable container while another thread processes another executable object in the executable container. The executable container object defines the functionality to execute the executable objects concurrently. In one or more embodiments of the invention, the executable container object is defined in an executable container class provided by a library. Similarly, in one or more embodiments of the invention, the executable object is derived from the executable container object.

FIG. 1 shows a schematic diagram of a system for generating a parallel application in accordance with one or more embodiments of the invention. As shown in FIG. 1, the system includes a library (102), source code (104), patterns (106), and executable code (108) in accordance with one or more embodiments of the invention.

In one or more embodiments of the invention, the library (102) is a collection of classes that assist in the development and execution of the application. The library (102) may have a development version and a runtime version. The development version may assist in developing the application while runtime version may be used during the execution of the executable code (108).

A class is a programming construct that groups data with the methods that act on the data. The library (102) provides classes for creating an application that may have threads execute concurrently. In one or more embodiments of the invention, the library (102) includes non-executable object classes (110), executable object class(es) (112), executable container class(es) (114), and debugging functions (116). Each of the components of the library (102) is discussed below.

The non-executable object class(es) (110) corresponds to a class for creating a non-executable object. A non-executable object may be virtually any type of object that is not specified as being able to execute concurrently with other objects.

The executable object class(es) (112) corresponds to a class, which includes the basic data and methods for creating an executable object. In general, an object is an instance of a class. In one or more embodiments of the invention, an object may be an executable object or a non-executable object. An executable object is an object that may be executed concurrently with other executable objects. A non-executable object is an object that is not declared as capable of being executed concurrently with other objects. In one or more embodiments of the invention, executable objects have an associated state. The state of the executable object indicates how the processing of the executable object is proceeding. For example, the state of the executable object may indicate whether the executable object is waiting to be processed, partially processed, or completely processed.

The executable object class(es) (112) defines the basic data and methods for different types of executable objects. The types of executable objects include a conditional executable object and a non-conditional executable object. A conditional executable object is an executable object that is dependent on external events (i.e., events that occur outside of the executable object). For example, the processing of the executable object may be contingent on a state of another executable object in order to be processed. In the example, a conditional executable object may require that another executable object has completed processing or has intermediate results before the conditional executable object can be processed.

In one or more embodiments of the invention, the condition of the conditional executable object may be maintained as a set of executable object pointers with a state, a set of pairs of object pointers with a state identifier indicating the state of the object, etc. A non-conditional executable object is an object whose processing is not contingent on external events.

Continuing with FIG. 1, an executable container class (114) is a class for creating an executable container. An executable container is a structure for relating executable objects that may be executed concurrently. Specifically, executable objects associated with the same executable container may be executed concurrently. In one or more embodiments of the invention, the executable container class (114) includes instructions for creating a concurrent execution environment (discussed below and in FIG. 2). The executable container class (114) may include instructions for calling the method to process the executable object.

In one or more embodiments of the invention, multiple different types of executable containers exist. In one or more embodiments of the invention, each of the different types of executable containers implements an ordering for processing the executable objects. In one or more embodiments of the invention, the ordering may be a queue, a priority queue, a stack, and a pool (including conditional pools). A queue is an ordering in which the executable objects are processed in the order in which the executable objects are added to the executable container. Thus, for example, the first executable object added to the container is the first executable object processed. Similarly, the second executable object added to the container is the second executable object processed. Those skilled in the art will appreciate that while a queue identifies an ordering of content, the objects may be execute concurrently after pulled from the queue.

In one or more embodiments of the invention, a priority queue is an ordering in which each executable object is assigned a priority value. Processing of the executable objects is performed according to the priority value assigned to the executable object. For example, executable objects with a higher priority may be processed before executable objects with a lower priority. In one or more embodiments of the invention, executable objects that have the same priority are processed in the order in which the executable objects are added to the container.

In one or more embodiments of the invention, a stack is an ordering in which executable objects are processed in reverse order. Specifically, the executable objects are processed in reverse of when the executable objects are added. For example, the first executable object added to the container is the last executable object processed. Conversely, the last executable object added to the container is the first executable object processed.

In one or more embodiments of the invention, the executable objects in a pool may be processed in any order. For example, a thread may simply obtain any unprocessed executable object from the pool without regard to when the executable object is added to the pool. If an executable object in the pool is a conditional executable object, then the conditional executable object is processed only after the partial conditions or full conditions for the conditional executable object are satisfied. In such cases, the pool may be referred to as a conditional pool.

In one or more embodiments of the invention, a conditional executable container allows for execution of conditional executable objects. In one or more embodiments of the invention, the conditional executable container defines a cyclic ordering. In a cyclic ordering scheme, all conditional executable objects are fully processed once in the conditional executable container before any conditional executable object is processed a second time. Thus, at each cycle, each conditional executable object is fully processed once. Executable objects may be partially or fully processed. A partially processed executable object is any object for which one or more conditions have not been satisfied. In one embodiment of the invention, the one or more of the conditions must be met prior to executing all or a portion of the methods on the executable object. An executable object is fully processed when all conditions of the executable object have been satisfied and all the methods been performed on the executable object and the executable object is placed in the local closed container. Thus, at a cycle, the same executable object may be partially processed multiple times in a given cycle until the executable object is fully processed. The ordering of the processing of executable objects within a cycle may be any of the orderings discussed above.

Rather than having different executable container classes for each of the different types of executable containers, the different types may be defined in a variable associated with a single executable container class. For example, the variable may have possible values representing a queue, a priority queue, a stack, a pool, and a conditional pool. For example, if the value of "queue" is assigned to the aforementioned variable during runtime, then the executable container implements a queue and the type of executable container is a queue.

In addition to the executable object class(es) and executable container class(es), the library may also optionally include debugging functions (116). A debugging function (116) allows the developer to remove errors in the source code of the application. For example, the debugging functions (116) may allow the developer to dump the internal states of the container and to make the executable container transparent to the developer.

Continuing with FIG. 1, source code (104) is a collection of instructions that define the application. In one or more embodiments of the invention, the source code (104) is written in an object-oriented programming language. For example, the programming language (104) may be C++, JAVA™, or other such object oriented language (JAVA™ is a trademark of Sun Microsystems, Inc. located in Santa Clara, Calif.). In one or more embodiments of the invention, the source code (104) includes a derived executable object class (118), an executable container object declaration (122), and a main class ((120)). Those skilled in the art will appreciate that other classes and instructions may be included in the source code.

In one or more embodiments of the invention, the derived executable object class (118) is a class that is derived from and therefore inherits from the executable object class. In one or more embodiments of the invention, the derived executable object class (118) includes and extends the functionality of one of the executable object class(es) (112). More specifically, the derived executable object class (118) includes the data and functions specific to the type of executable object required by the application.

In one or more embodiments of the invention, the derived class includes a process method definition (124), which includes instructions that specify how to process the executable object. Specifically, the instructions define the operations to perform on the data in the executable object. In one or more embodiments of the invention, a given executable object may perform an operation on data concurrently with a different executable object performing the same operation on data. In a scenario in which the data on which both executable objects are performing the operation is the same, than concurrent services (discussed below) may be used to manage the access to the data.

In one or more embodiments of the invention, the process method definition (124) may also include instructions for creating at least one additional executable object. The additional executable object may operate on different data than the original executable object.

The following is an example of a way to create an example application with the derived class of the executable object class and the process method to solve the knapsack problem. The basic formulation of the knapsack problem is as follows: A thief is in the store with a backpack (i.e., the knapsack). The store stocks a variety of items and each item has an associated value and an associated weight. The thief can only carry a pre-specified maximum amount of weight of all items in the backpack. The thief wants the maximize total value of items in his backpack without exceeding the pre-specified maximum amount of total weight.

The example application may be designed to calculate which items the thief should carry. One way for the application to be designed is to have derived class of the executable object class represent a subset of the problem space. Specifically, each instance of the executable object may have data specifying the following sets: items in the backpack, items not in the backpack, and items not processed. The example process method in an executable object class may include instructions to create two new executable objects from a single executable object. The first executable object moves a single item from the items not processed set to the items in the backpack set. The second executable object moves the same single item from the items not processed set to the items not in the backpack set. Thus, the problem space is reduced by the single item that is no longer in the items not processed set.

When executed, the initial executable object placed in the executable container represents the state in which all items in the backpack are unprocessed. The processing of the initial executable object creates two new executable objects as discussed above The two newly created executable objects may be executed concurrently. One skilled in the art will appreciate that process method may also include additional instructions, such as instructions to create the first executable object only when adding the single item to the items in the backpack set does not exceed the maximum amount of weight and instructions to keep track of the current total value of items in the backpack.

Continuing with FIG. 1, in one or more embodiments of the invention, the process method definition (124) is named with a standard name, such as "process". Using the standard name, an executable container object may process an executable object by including an instruction "executable_object_name.process( )". Because all derived executable object classes have the same standard name for the process method definition (124), the executable container class can use the standard name to process executable objects according to the type of processing required.

Continuing with the source code (104), the source code (104) may include a main class (120), which is the class used to initiate processing of the application. Specifically, the instructions in the main class are the instructions of the application that are first executed. The main class (120) typically includes references to objects created from other classes. In one or more embodiments of the invention, if the source code is a sub-program, then the source code (104) may not include the main class (120).

In one or more embodiments of the invention, the executable container object declaration (122) corresponds to at least one instruction to create an instance of the executable container object class (114). The executable container object declaration may be in the main class (120) or in another class in the source code (104). The executable container object declaration (122) may be used by the source code (104) to add objects to the executable container object and to execute the executable container object.

Continuing with FIG. 1, the patterns (106) correspond to templates for creating concurrency in an application in accordance with one or more embodiments of the invention. Specifically, each pattern provides a template with the instructions for creating derived classes of the executable object class and the appropriate executable container object declaration(s). For example, consider the scenario in which a developer wants to traverse a tree data structure in order to perform an operation at each node of the tree. In one or more embodiments of the invention, a pattern exists that includes the code for performing a tree traversal in which the operations on nodes of the tree are performed concurrently. Thus, a developer using the pattern may only need to write code within the pattern to define the process method to perform on each encountered node.

When the source code is compiled, executable code (108) is created. Executable code (108) corresponds to instructions that are understandable by a computer system. The instructions in the executable code (108) may be executed by a computer system. In one or more embodiments of the invention, the executable code (108) is linked with the library (102).

Figure 2:
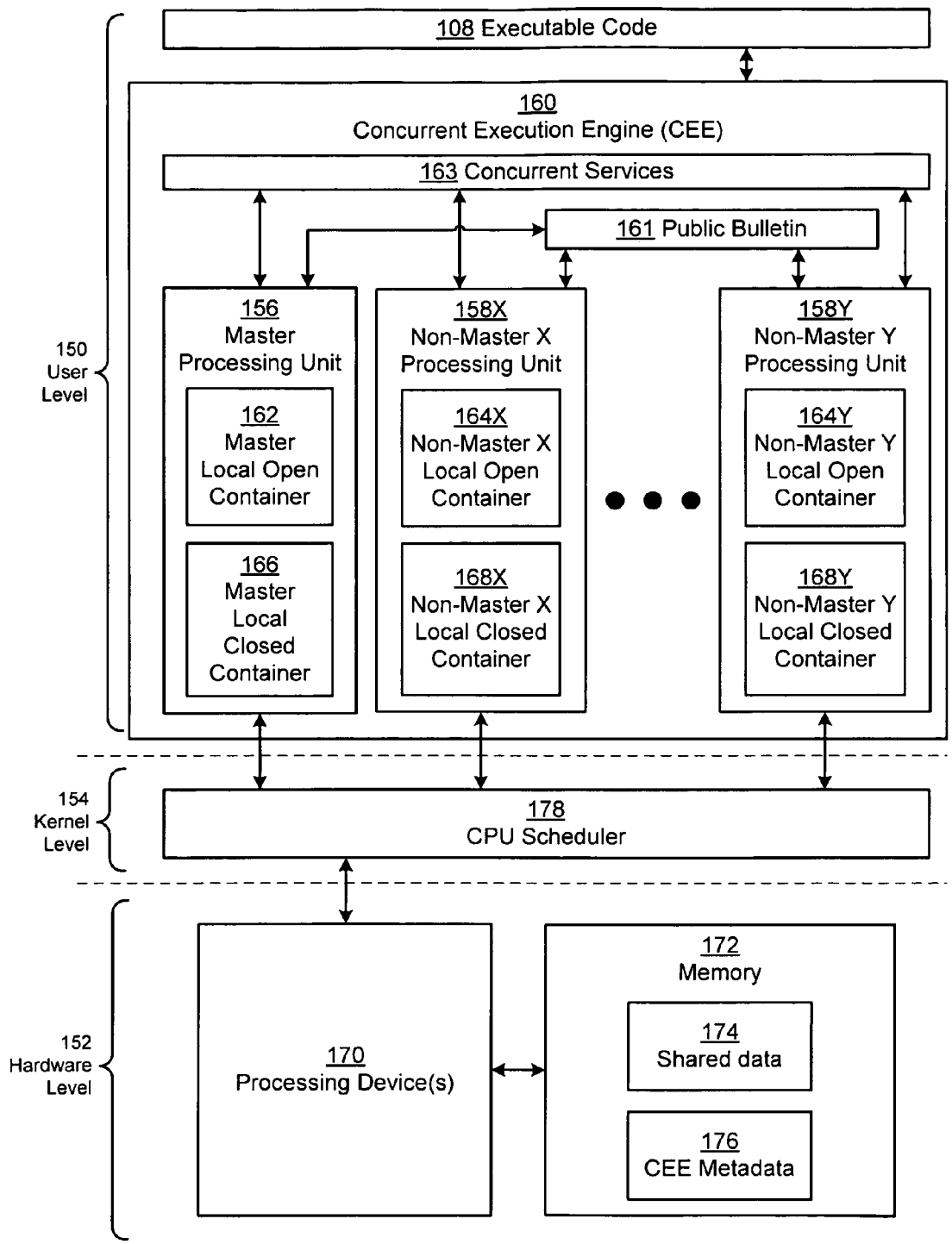

FIG. 2 shows a schematic diagram of a concurrent execution environment in accordance with one or more embodiments of the invention. As shown in FIG. 2, the concurrent execution environment may span multiple different hardware and software levels of the computer system, such as the user level (150), the hardware level (152), and the kernel level (154).

In one or more embodiments of the invention, the user level (150) corresponds to the applications that execute with limited hardware management capability. Specifically, the user level (150) corresponds to the execution environment for executing applications for the user. In one or more embodiments of the invention, the user level (150) includes executable code (108) (discussed above) and a concurrent execution engine (CEE) (160). Each of these components is discussed below.

The CEE (160) provides for the concurrent execution of threads in accordance with one or more embodiments of the invention. In one or more embodiments of the invention, the CEE (160) includes a master processing unit (156), one or more non-master processing units (158X, 158Y), a public bulletin (161), and concurrent services (163). Each of the components of the CEE (160) are discussed below.

In one or more embodiments of the invention, the master processing unit (156) and the non-master processing units (158X, 158Y) are run-time data structures for tracking executable objects. Tracking executable objects includes maintaining information about the stage of processing of the executable objects. Specifically, each processing unit (156, 158X, 158Y) includes a local open container (162, 164X, 164Y) and a local closed container (166, 168X, 168Y). The local open container (162, 164X, 164Y) is a run-time data structure for tracking executable objects that have not yet been processed. Further, the local open container (162, 164X, 164Y) may also include executable objects that are only partially processed. For example, if the execution of an executable object is conditioned upon another executable object in order to be fully processed, then the executable object may be partially processed and placed back into the local open container (162, 164X, 164Y) while waiting on the other executable object.

In one or more embodiments of the invention, the local closed container (166, 168X, 168Y) is a container for tracking executable objects that are being processed or that have been processed. Specifically, the local closed container (166, 168X, 168Y) may also be implemented as a run-time data structure for tracking the executable objects. In one or more embodiments of the invention, executable objects in the local closed container (166, 168X, 168Y) may not be moved to a different processing unit (156, 158X, 158Y).

In one or more embodiments of the invention, each processing unit (156, 158X, 158Y) tracks executable objects for a specific thread. Specifically, each thread has a single corresponding master processing unit (156) or non-master processing unit (158X, 158Y). In one or more embodiments of the invention, the master processing unit (156) is a processing unit for the main thread or the parent thread. Child threads are spawned from the main thread and are each associated with a separate non-master processing unit (158X, 158Y).

In one or more embodiments of the invention, any thread (i.e., main thread or child thread) may obtain an executable object from any other local open container (162, 164X, 164Y). Thus, once a thread has completed processing of all executable objects or if all executable objects are waiting on an external event in its own corresponding local open container, then the thread may obtain an executable object from another processing unit's local open container (162, 164X, 164Y).

In one or more embodiments of the invention, in the case in which the executable container executes cyclic computation, once the executable objects are fully processed for the current cycle, the executable objects are in the local closed container (166, 168X, 168Y). The processing of the next cycle may be initiated by moving the executable objects from the local closed containers (166, 168X, 168Y) to the corresponding local open containers (162, 164X, 164Y). The move may be performed by copying the executable objects, by renaming the local open container (162, 164X, 164Y) and the local closed container (166, 168X, 168Y), or performing any other such technique that achieves similar results.

Continuing with FIG. 2, the public bulletin (161) is a data structure for storing information about executable objects that are fully processed. Specifically, the public bulletin (161) identifies the executable objects in each local closed container (166, 168X, 168Y). The public bulletin (161) may also include data associated with each fully processed executable object. For example, the data may include results of processing the executable object and/or the data processed by the executable object.

In one or more embodiments of the invention, the concurrent services (163) includes functionality to manage the execution of the processing units (156, 158X, 158Y). Specifically, in one or more embodiments of the invention, the concurrent services (163) includes functionality to provide services to the processing units (156, 158X, 158Y). In one or more embodiments of the invention, the concurrent services (163) include a reduction service, an object introspection service, an object deletion service, and an object dependency service. In one or more embodiments of the invention, each of the concurrent service (163) includes functionality to access the public bulletin (161) to provide the service. Each of the different services is discussed below.

In one or more embodiments of the invention, the reduction service includes a set of one or more reduction methods to allow an application to generate a combined result from the execution by different threads. Specifically, each of the different threads or even each of the different executable objects may produce an intermediate result that is specific to the thread or the executable object. The reduction service includes functionality to combine the intermediate results as defined by the executable code into the single combined result.

In one or more embodiments of the invention, the object inspection service includes functionality to analyze already existing executable objects to determine whether a newly created executable object is inferior to any already existing object that are in progress or that have completed processing. If the newly created executable object is inferior, then the newly created executable object may be deleted and, accordingly, not processed. If the newly created executable object is not inferior, then the newly created executable object may be added to the local open container (162, 164X, 164Y). In one or more embodiments of the invention, the executable code (108) defines the comparison function to determine whether the newly created executable object is inferior.

In one or more embodiments of the invention, the object deletion service includes functionality to analyze already existing executable objects to determine whether a newly created object is superior to any already existing object that is not yet processed (e.g., unprocessed executable object in the local open container (162, 164X, 164Y)). If the newly created object is superior, then the existing inferior executable object may be deleted. In one or more embodiments of the invention, the executable code (108) defines the comparison function to determine whether the newly created executable object is superior to existing objects.

In one or more embodiments of the invention, the object dependency service includes functionality to determine when a conditional executable object may be processed. A conditional executable object may be processed when the conditions of the conditional executable object are satisfied. In one or more embodiments of the invention, the object dependency service includes functionality to distinguish between partial and full conditions. A partial condition is one in which only some of the conditions need to be satisfied before the conditional executable object can start being processed. Specifically, when the partial conditions are satisfied, the conditional executable object is processed and returned to the local open container (162, 164X, 164Y) to wait for the remaining conditions to be satisfied. A full condition requires that after the conditional executable object is processed, the conditional executable object may be completely processed and is moved to the local closed container (166, 168X, 168Y).

Continuing with FIG. 2, in one or more embodiments of the invention, the hardware level (152) corresponds to the physical device on which the application is executed. In one or more embodiments of the invention, the hardware level includes one or more processing devices (170) and memory (172).

A processing device (170) corresponds to hardware that includes functionality to execute instructions. In one or more embodiments of the invention, each processing device may be a micro-core or a processor. For example, a multi-processor system may have multiple processing devices (170), each corresponding to individual processors. In another example, a single multi-core processor may have multiple processing devices (170), each corresponding to individual micro-cores or cores. Alternatively, the processing device (170) may be a single core processor that includes functionality to execute multiple threads concurrently.

Memory (172) corresponds to a storage area for data. The memory may include any level of the memory hierarchy. For example, although not shown in FIG. 2, the memory may be cache memory on the processing devices (170). In one or more embodiments of the invention, the data stored in memory includes shared data (174) and CEE metadata (176). The shared data (174) includes the data that is shared by multiple processing units (156, 158X, 158Y). For example, the shared data may include intermediate results from processing executable objects, the state of each executable object, and the processing unit (156, 158X, 158Y) having the executable object. The shared data (174) may also include any final results generated by the processing.

In one or more embodiments of the invention, the CEE metadata (176) includes data used by the CEE (160) to manage the processing units (156, 158X, 158Y). For example, the CEE metadata (176) may include information about the number of processing units (156, 158X, 158Y), identifiers of the threads corresponding to each processing unit, and information about the different services provided by the CEE (160).

In one or more embodiments of the invention, a kernel level (154) is interposed between the user level (150) and the hardware level (152). The kernel level (154) includes functionality to perform privileged tasks related to the management of the computer system. In one or more embodiments of the invention, the kernel level includes a CPU scheduler (178). The CPU scheduler (178) includes functionality to schedule threads for execution on the processing devices (170). Various methods known in the art may be implemented by the CPU to schedule the threads on the processing units (170). For example, the CPU scheduler (178) may schedule the master thread corresponding to the master processing unit (156) on processing device 1 (not shown) and a non-master thread corresponding to a non-master processing unit Y (158Y) on processing device 2 (not shown). In another example, the CPU scheduler (178) may include functionality to schedule threads in time slices. In this example, a single processing device may continually switch between processing the master thread and one or more non-master threads according to the time slices and the CPU scheduler.

Figure 3:
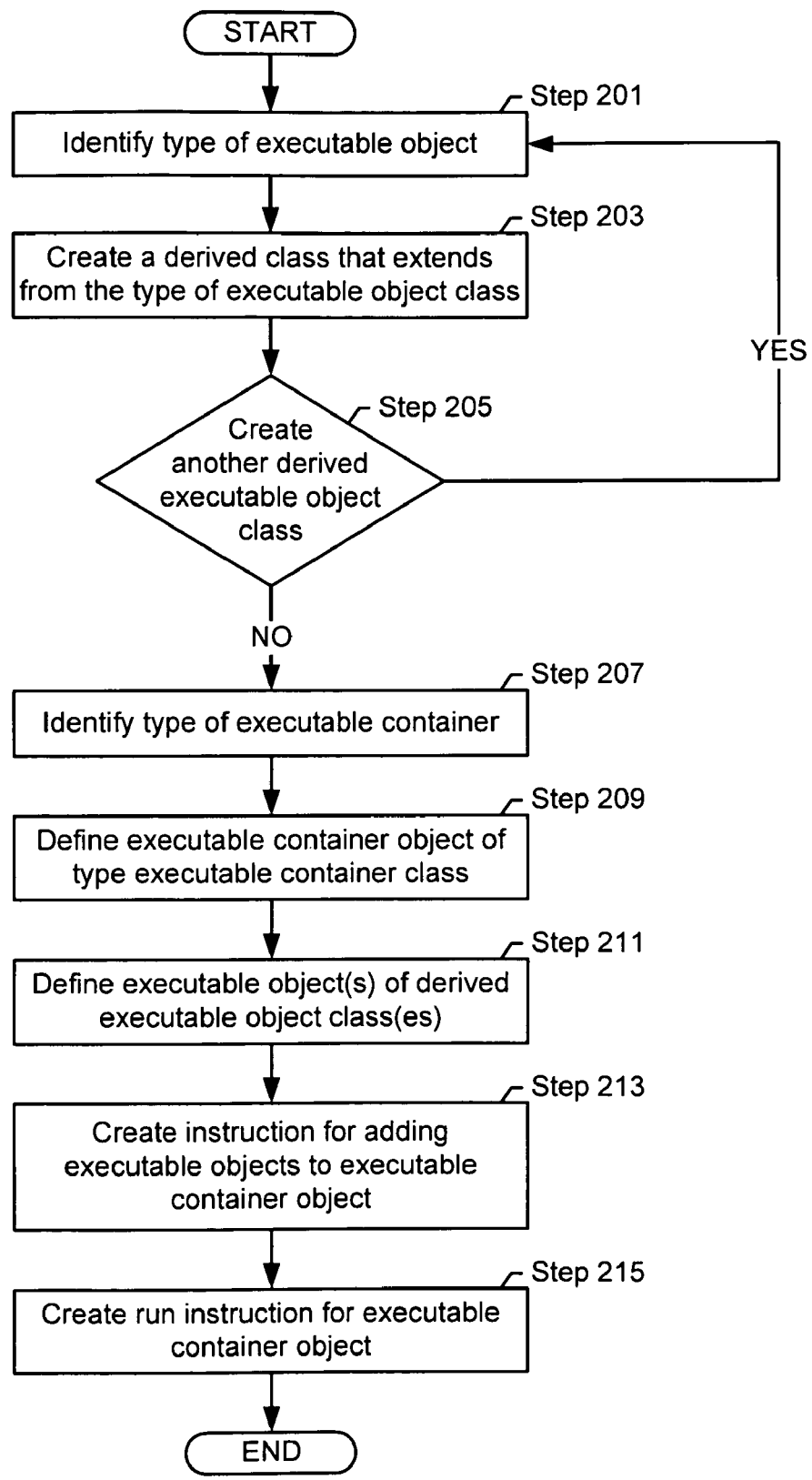
FIGS. 3-5 show flowcharts in accordance with one or more embodiments of the invention.
Figure 4:
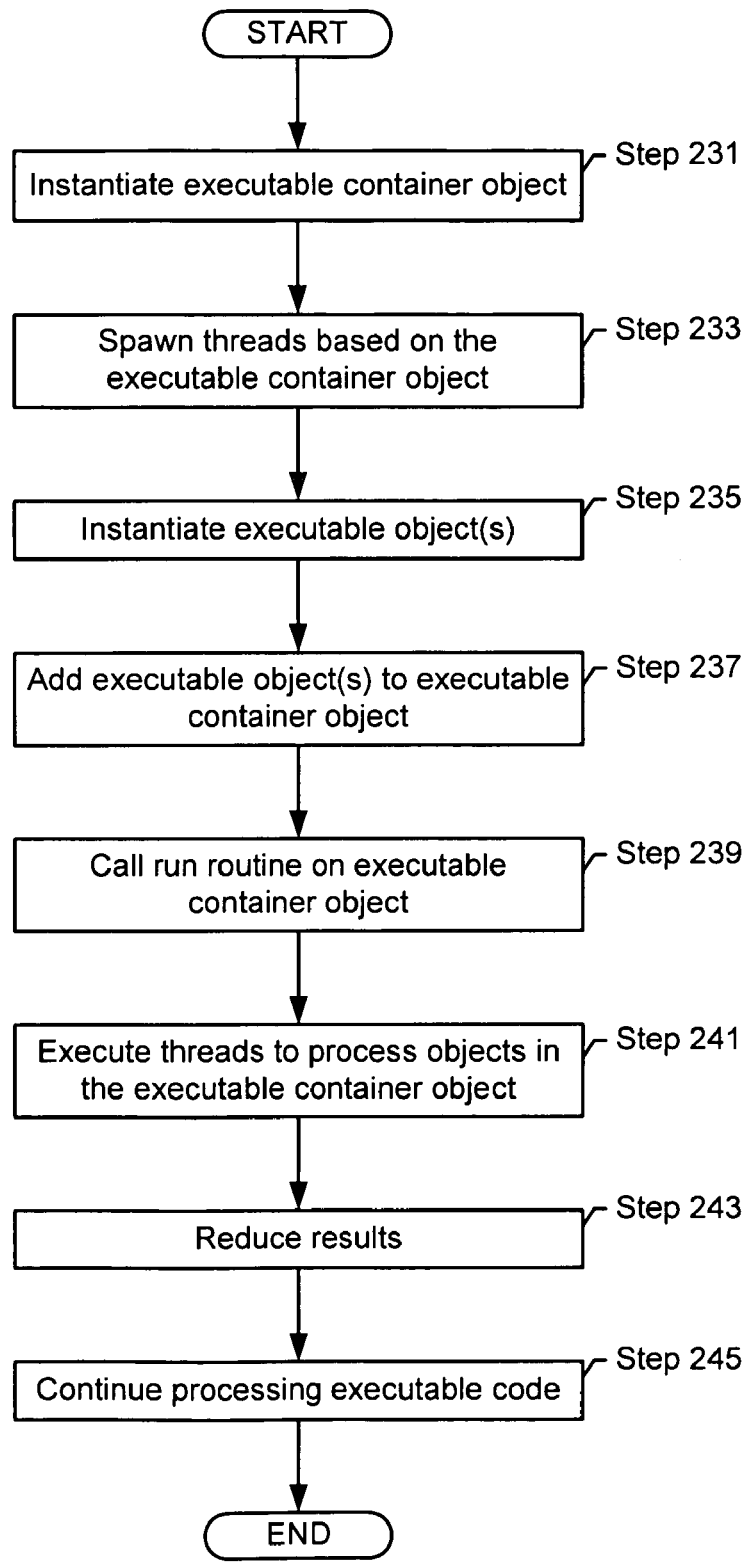
Figure 5:
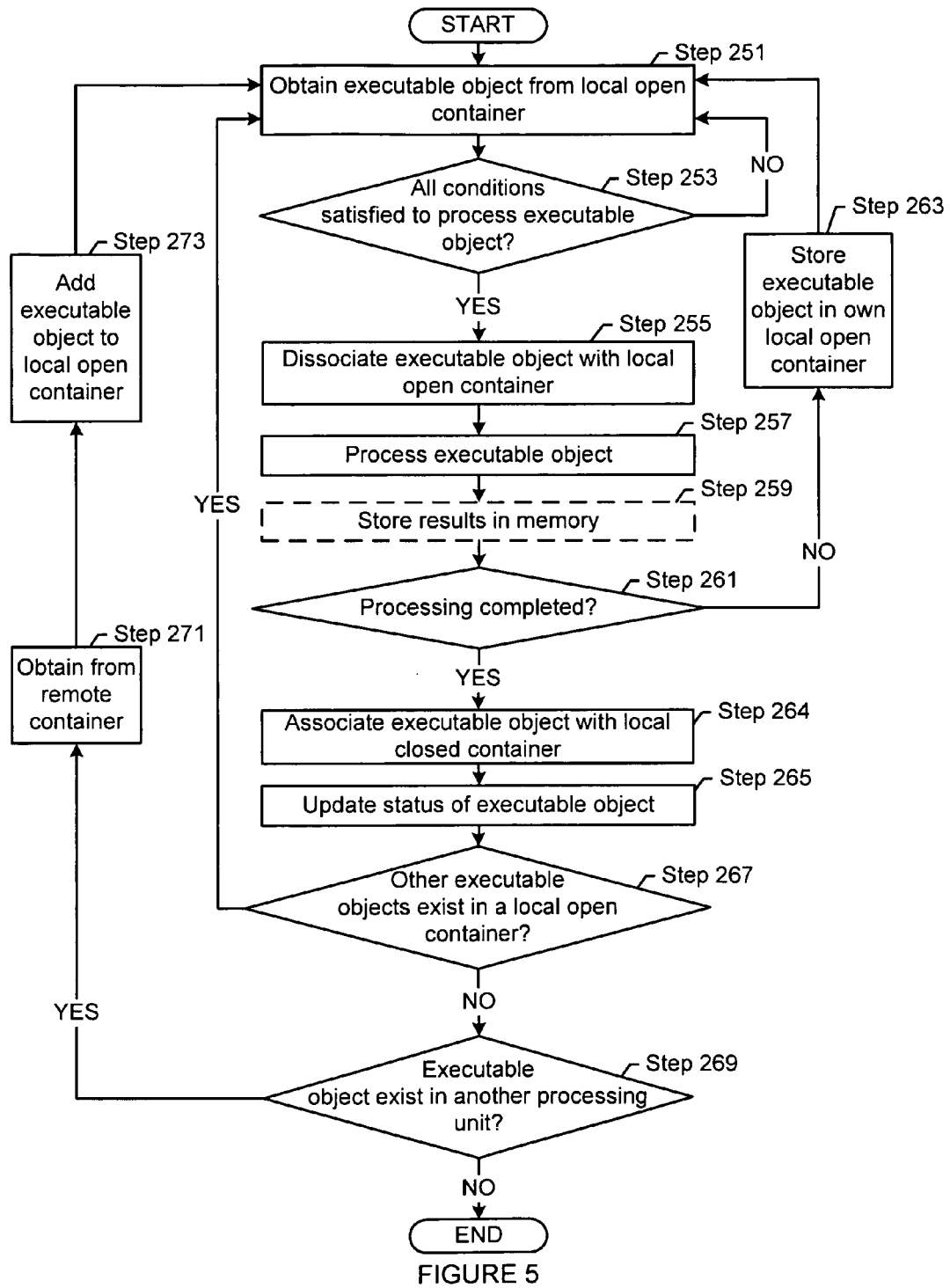

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

FIG. 3 shows a flowchart for a developer or a code generator to create an application in accordance with one or more embodiments of the invention. FIG. 4 shows a flowchart of the execution of the application created in FIG. 3 in accordance with one or more embodiments of the invention. In one or more embodiments of the invention, FIG. 5 shows a flowchart describing step 241 of FIG. 4 in more detail. Specifically, FIG. 5 shows a flowchart of how each thread may process executable objects concurrently with other threads.

FIG. 3 shows a flowchart of a method for creating an application in accordance with one or more embodiments of the invention. Specifically, FIG. 3 shows steps that a developer or code generator may perform to create the application, such that executable objects of the application execute concurrently. Certain steps common to the development of applications, such as creating a new file, adding statements for including applicable libraries, designing the application, and adding instructions specifically related to the operations performed by the application, have been omitted so as to not unnecessarily complicate the description. One skilled in the art having benefit of the disclosure will understand how to incorporate the steps of FIG. 3 into the application development process.

In step 201 of FIG. 3, the type of executable object is identified in accordance with one or more embodiments of the invention. Specifically, an object that may be processed concurrently is identified. The identified object is an executable object. Based on the identified executable object, a determination is made as to the type of executable object. For example, if the processing of the executable object is dependent on an event occurring, then the type of executable may be determined to be a conditional executable object. In another example, if the processing of executable object is independent of external events, then the executable object may be determined to be a non-conditional executable object.

In step 203, a derived class that extends the type of executable object class is created in accordance with one or more embodiments of the invention. Specifically, a class is created for the specific executable objects. In one or more embodiments of the invention, the created class is defined so as to inherit from the appropriate executable object class in the library. The appropriate executable object class is the executable object class representing the type of executable object.

In one or more embodiments of the invention, the body of the derived class of the executable object class is also created. In one or more embodiments of the invention, creating the body of the derived class includes adding the process method to the body to specify how to process the executable object. The instructions in the process method may be dependent on the type and function of the executable object and application.

In step 205, a determination is made about whether to create another derived class of the executable object class. For example, multiple different executable objects that are created from different derived classes may be in the same application in accordance with one or more embodiments of the invention. In such a scenario, the steps for creating the derived class of the executable object class be may repeated starting with Step 201.

In step 207, the type of executable container is identified in accordance with one or more embodiments of the invention. In one or more embodiments of the invention, the type of executable container is dependent on the application. For example, if the application performs cyclic processing, then the type of executable container may be determined to be a pool. In another example, if the executable object is a node in the tree data structure and processing the executable object is to traverse the tree data structure, then the type of executable container may be a stack or a queue depending on whether depth-first or breath-first traversal is desired.

In step 209, an executable container object of the type of executable container class is defined in accordance with one or more embodiments of the invention. In one or more embodiments of the invention, an instruction is added to a method of the application to instantiate a new executable container of the type of executable container class. The format of the instruction may be based on the format required by the executable container class in the library.

In step 211, one or more executable objects of the derived executable object class(es) are defined in accordance with one or more embodiments of the invention. In one or more embodiments of the embodiments of the invention, at least one instruction is added to a method in the source code to instantiate one or more new executable objects. Specifically, each instruction creates at least one instance of a derived class of an executable object class.

In step 213, an instruction for adding executable objects to the executable container object is created in accordance with one or more embodiments of the invention. In one or more embodiments of the invention, the instruction may be defined as specified by the executable container object class in the library. For example, consider the scenario in which the executable container class in the library implements the method "push( )" which takes as parameters the executable objects to add to an executable container. In the example, if, in step 209, the instruction to create a new executable container names the container MyContainer and the executable objects to add to the container include objects named, "ObjA", "ObjB", then the instruction may be of the form "MyContainer.push(ObjA, ObjB)".

In one or more embodiments of the invention, the term "adding", "pushing", and other such terms in the description is used to simplify the description. In one or more embodiments of the invention, the aforementioned terms may correspond to "associating". For example, associating the executable object with the executable container may be implemented by creating a relationship or reference between the executable object and the executable container. For example, if the executable container is implemented as an array of pointers, then associating the executable object with the executable container may be performed by changing one of the pointers to represent the executable container. In another example, executable container may be implemented as an array of executable objects, then associating the executable object with the executable container may be performed by setting the virtual address of the executable object to an address corresponding to an element in the array. One skilled in the art will appreciate that various techniques may be used to implement the "associating."

In step 215, a run instruction is created for the executable container object in accordance with one or more embodiments of the invention. In one or more embodiments of the invention, executing the run instruction initiates the creation of the run-time data structures (e.g., master and non-master processing units) and execution of the CEE. In one or more embodiments of the invention, the run instruction, the instruction to define the executable container object in Step 209, or another such instruction, may specify the number of threads to use in the CEE. In one or more embodiments of the invention, a default number of threads may be used.

In addition to the steps discussed above, the developer or code generator may perform additional steps common to the development of applications to complete developing the application. Further, the developer or code generator may debug and compile source code to generate the executable code. In one or more embodiments of the invention, once the executable code is generated, the application may be executed.

FIGS. 4 and 5 show flowcharts for executing the application in accordance with one or more embodiments of the invention. As shown in FIG. 4, in step 231, when executing the application, an executable container object is instantiated in accordance with one or more embodiments of the invention. Specifically, an instance of the executable container object is created.

In one or more embodiments of the invention, the threads are spawned based on the executable container object in step 233. Specifically, at this stage, new threads are created. The new threads may be child threads of an already executing master thread. Each of the new threads may be associated with a processing unit.

In step 235, executable objects are instantiated in accordance with one or more embodiments of the invention. Specifically, the instruction for defining an executable object of the derived class is executed in accordance with one or more embodiments of the invention. In one or more embodiments of the invention, the executable objects are added to the executable container in step 237.

In step 239, a run routine is called on the executable container in accordance with one or more embodiments of the invention. In one or more embodiments of the invention, calling the run routine executes the run method on the executable container. At this stage, the CEE may be activated for the executable container.

In step 241, the threads execute to process the executable objects in accordance with one or more embodiments of the invention. The execution of the threads is discussed below and in FIG. 5. Specifically, FIG. 5 shows a flowchart of how a thread may execute the executable objects concurrently with other threads.

Continuing with FIG. 4, in one or more embodiments of the invention, the execution of the threads may generate intermediate results. Optionally, in step 243, the intermediate results may be reduced to create a final result of executing the executable objects concurrently. In one or more embodiments of the invention, the reduction of the intermediate results may be performed while executing the threads in step 243. For example, if the goal is to find a maximum value of the intermediate result, then the reduction may be performed by comparing each intermediate result with a current maximum. If the intermediate result is greater than the current maximum, then the intermediate result may replace the current maximum.

In one or more embodiments of the invention, the executable code continues processing in step 245. The continual processing of the executable code may include creating new instances of the executable container object, adding different executable objects to the executable container objects, and/or performing virtually any other operation.

FIG. 5 shows a flowchart for executing a thread in accordance with one or more embodiments of the invention. Specifically, the steps discussed in FIG. 4 may be the operations that are performed when executing a thread in accordance with one or more embodiments of the invention.

In step 251, an executable object is obtained from a local open container in accordance with one or more embodiments of the invention. In one or more embodiments of the invention, when the threads first obtain an executable object, the executable object is obtained from the master's local open container. Specifically, in one or more embodiments of the invention, all executable objects are initially associated with the master's local open container. If an executable object does not exist in a local open container, then the thread waits until an executable object exists in accordance with one or more embodiments of the invention. In one or more embodiments of the invention, the executable objects are obtained according to the type of local open container. For example, if the local open container implements a queue, then the first thread to obtain an executable object obtains the first executable object added to the container. Likewise, in the example, the second thread may obtain the second executable object added to the container.

In step 253, a determination is made whether all conditions are satisfied to process the executable object. In one or more embodiments of the invention, if the executable object is a non-conditional executable object, then this step may be skipped. In one or more embodiments of the invention, if the executable object is a conditional executable object that has partial conditions, then the determination is made whether at least the partial conditions are satisfied to process the executable object. In one or more embodiments of the invention, determining whether the conditions are satisfied may be performed, for example, by accessing shared memory to determine the status of other executable objects. In one or more embodiments of the invention, determining whether the conditions are satisfied may be performed by accessing a status variable associated with each condition. The status variable may have a flag indicating whether the condition is satisfied. If the condition is not satisfied, then the executable object may be returned to the local open container.

Although not shown in FIG. 5, a separate thread may be used to mark executable objects that have conditions satisfied and may be executed. For example, the separate thread may iterate through the processing units and update the status of the executable objects. Thus, the thread associated with the processing unit may only obtain executable objects that are ready for processing.

In step 255, when an executable object is ready for processing, then the executable object is removed or dissociated with the local open container in accordance with one or more embodiments of the invention. By removing or disassociating the executable object from the local open container, the thread may indicate to the remaining threads that the executable object is being processed or has completed processing. Thus, other threads do not obtain the executable object.

In step 257, the thread processes the executable object in accordance with one or more embodiments of the invention. Processing the executable object may create additional executable objects. In such a scenario, the additional executable objects may be added to the local open container of the processing unit with which the thread is associated. For example, the non-master thread may add the executable object to the local open container of its corresponding non-master processing unit. Additionally, the processing of the executable object may create temporary results for use by the thread and/or intermediate results. In step 259, the results are stored in memory. In one or more embodiments of the invention, the results may be stored, for example, while processing the executable object. Although not shown in FIG. 5, storing the results may require first obtaining exclusive access to the memory or to a portion of memory. Various techniques known in the art may be used to obtain the exclusive access.

Once the thread has finished processing the executable object, a determination is made whether processing the executable object is complete in step 261. For example, if the executable object is a conditional executable object, then processing the executable object may not be complete. For example, the executable object may need to wait for additional conditions to be satisfied before processing may continue. If processing of the executable object is not complete, then the executable object may be added to or associated with the local open container in step 263. Although not shown in FIG. 5, the status of the executable object may be updated to reflect that the processing of the executable object is partially performed.

In one or more embodiments of the invention, if a determination is made that the processing of the executable object is complete, then the executable object is associated with the local closed container in step 264. By associating the executable object with the local closed container, the threads may identify the executable object as fully processed.

In step 265, the status of the executable object is updated to reflect that the processing is complete in accordance with one or more embodiments of the invention. In one or more embodiments of the invention, the thread publishes the status of the executable object to other processing units. In one or more embodiments of the invention, the thread may store the status of the executable object in shared memory.

The thread may then continue processing additional executable objects. In one or more embodiments of the invention, a determination is made whether an executable object exists in the thread's local open container in step 267. If an executable object exists in the thread's local open container, then the executable object is obtained. In one or more embodiments of the invention, the executable object that is obtained corresponds to the type of local open container. In one or more embodiments of the invention, each thread may implement a separate priority protocol for obtaining executable objects. For example, the thread may obtain the highest priority executable object from its own local open container. The highest priority executable object that is obtained may not be the globally highest priority executable object. In the example, the globally highest priority executable object may exist in a different local open container.

In one or more embodiments of the invention, if an executable object does not exist in the threads local open container, then a determination is made whether an executable object exists in another processing unit in step 269. Specifically, a determination is made whether another executable object exists in another processing unit's local open container. In step 271, if an executable object does exist in another processing unit, then the executable object is obtained from the remote container. The executable object may be added to the thread's local open container in step 273 and the method may repeat. As an alternative, after obtaining the executable object from the remote container, the executable object may be immediately processed, thereby bypassing the thread's local open container.

If, in step 269, a determination is made that an executable object does not exist in another processing unit, then the processing may continue as discussed in FIG. 4. At this stage, the non-master threads may be destroyed when the application continues processing.

Although not shown in FIG. 4, if the executable container implements cyclic computations, then once all executable objects in all local open containers are fully processed and are in the local closed containers, then the method may repeat for the next cycle. Specifically, the executable objects may be moved back to the local open container and the state of the executable objects may reset. Thus, threads may continue processing the executable objects.

In the following examples, consider the scenario in which the application is designed to solve the traveling salesman problem. The traveling salesman problem is formulated as follows: A traveling salesman wants to visit each of N cities exactly once and traveling the shortest distance. Thus, the solution to the traveling salesman problem identifies the path that the traveling salesman should follow. The traveling salesman problem is often represented as a graph with N nodes that represent the N cities and M edges representing the roads between the cities. The goal is to find a Hamiltonian Circuit that touches each node exactly once. The following examples solve the traveling salesman problem for a complete graph. A complete graph is a graph that has an edge between every two nodes.

The following examples are for exemplary use only. Specifically, the following is not intended to limit the scope of the invention. The following examples start with an empty path. The path is processed by creating additional potential paths. Specifically, a different edge is each of the potential paths. Thus, each of the potential paths is lengthened by one. Then, the potential paths are processed as discussed above with creating more potential paths. At each stage of the processing, if the potential path already has a length greater than a heuristically determined maximum length, then the processing of the path stops. When a potential path is complete (i.e., includes all nodes) then a determination is made whether the potential path is shorter than the current optimal path. If so, the potential path replaces the current optimal path.

The first example, below, shows pseudo-code representing how a developer may develop the source code to solve the traveling salesman problem without using executable objects or concurrent execution of objects. Specifically, the example shows a serial solution to performing the algorithm discussed above.

Code Sample 1: Serial Solution

```
1.   class Node;
2.   class Edge;
3.   class Path;
4.   currentBestCompletePath = NULL;
5.   currentBestCompletePathLength = veryLargeValue;
6.   std::stack<Path*> myStack;
7.   class Path {
8.      EdgeList; /* list of edges already in Path */
9.      ForbiddenList; /* list of edges heurstically determined to not
                belong to this particular path */
10.     int pathLegth;
11.     int lowerBound; /* heuristically computed lower bound of
                potential complete path for a given partial path */
12.     void addEdge(Edge* edge);
13.     int process( );
14.  }
15.
16.  int Path:: process( ) {
17.     for each newEdge from list of all edges do
18.        if newEdge is already in this path's EdgeList or ForbiddenList
                then
19.           continue;
20.        endif
21.        newPath = new Path (copy of this current path);
22.        newPath->addEdge(newEdge);
23.        if newPath is a complete path then
                /* We found a complete traveling salesman solution - check
                   if it is better than the previously known best */
24.           if (newPath->pathLength < currentBestCompletePathLength)
                then
25.              currentBestCompletePathLength = newPath->pathLength;
26.              currentBestCompletePath = newPath;
27.           else
28.              delete newPath;
29.           endif
30.        else if (newPath->lowerBound >
                currentBestCompletePathLength)
31.           delete newPath;
32.        else
33.           myStack.push(newPath);
34.        endif
35.     end for;
36.  }
37.  int main ( ) {
```

-continued

Code Sample 1: Serial Solution

```
38.    initNodesAndEdges( );
39.    Path *init = new Path( ) /* Empty path */
40.    myStack.push (init);
41.    while (myStack is not empty) do
42.       tPath = myStack.pop( );
43.       tPath->process( );
44.    end while;
45. }
```

In the above example, in lines 1-3 the classes of node, edge and path are declared. Further, global variables for keeping track of the current best path and the current best path length are defined in lines 4 and 5. In line 6, a new stack is declared for keeping track of potential paths that are processed.

Lines 7-14 include instructions for the class path, lines 15-35 include instructions for a method to process a path, and lines 36-44 includes instructions for the main method. In the class path (lines 7-14), instructions are added to keep track of the list of edges in the path (line 8), the list of edges that do not belong to the path (line 9), the current path length (line 10), and a lower bound for the size of the path (line 11). The class path (lines 7-14) also includes an instruction to add an edge to the current path (line 12). Line 13 is a call to the method to process the path.

The method to process the path in the example is in lines 15-35. As shown in line 16-34, the method is performed for all unprocessed edges (i.e., edges that are not yet added to the path). In line 20, a new path is instantiated that is a copy of the current path. In line 21, one of the unprocessed edges is added to the path. Lines 22-28 are performed if the new path is complete. Specifically, in lines 23-25, a determination is made whether new path is shorter than the current complete optimal path. If the new path is shorter, then the new path replaces the current complete optimal path. Otherwise, the new path is deleted. Lines 29-33 are performed if the new path is not complete. In lines 29-30, if the length of the new path must exceed the current optimal path when the new path is complete, then the path is deleted. Otherwise, the new path is added to a stack for processing.

The main method (lines 36-44) includes instructions for processing the new paths. Specifically, in line 37, a new data structure is created that contains the nodes and edges of the graph. In line 38, an empty path is created and added to the stack. Lines 44-43 include instructions for processing the stack by removing paths from the stack and processing each path.

The second example, below, shows pseudo-code representing how a developer may develop the source code to solve the traveling salesman problem using concurrent execution of the executable objects in accordance with one or more embodiments of the invention. As shown in the second example, the basic technique for creating the source code is the same in accordance with one or more embodiments of the invention. Specifically, in one or more embodiments of the invention, the developer may only need to change a few lines of code in order to create an application that executes concurrently. In the example, the executable objects represent the paths. By having the executable objects represent the paths, multiple paths may be processed concurrently. If the paths are processed concurrently in parallel, then the processing may create significant execution time savings without much change by the developer.

Code Sample 2: Concurrent Solution

```
1.  class Node;
2.  class Edge;
3.  currentBestCompletePath = NULL;
4.  currentBestCompletePathLength = veryLargeValue;
5.  class Path : public ex_object_t {
6.     EdgeList; /* list of edges already in Path */
7.     ForbiddenList; /* list of edges heuristically determined to not
           belong to this particular path */
8.     int pathLength;
9.     int lowerBound; /* heuristically computed lower bound of
           potential complete path for a given partial path */
10.    void addEdge(Edge* edge);
11.    int process(executable_container_t *myExContainer);
12. }
13.
14. int Path:: process( )(executable_container_t *myExContainer) {
15.    for each newEdge from list of all edges do
16.       if newEdge is already in this path's EdgeList or
             ForbiddenList then
17.          continue;
18.       endif
19.       newPath = new Path (copy of this current path);
20.       newPath->addEdge(newEdge);
21.       if newPath is a complete path then
             /* We found a complete traveling salesman solution -
                check if it is better than the previously known best */
22.          if (newPath->pathLength < currentBestCompletePathLength)
                then
23.             currentBestCompletePathLength = newPath->pathLength;
24.             currentBestCompletePath = newPath;
25.          else
26.             delete newPath;
27.          endif
28.       else if (newPath->lowerBound >
             currentBestCompletePathLength)
29.          delete newPath;
30.       else
31.          myExContainer->push(newPath);
32.       endif
33.    end for;
34. }
35. int main ( ) {
36.    initNodesAndEdges( );
          /* specify the desired number of threads in the constructor */
37.    ec_stack_t myStackExContainer(numberOfThreads,
          containerAttributes);
38.    Path *init = new Path( ) /* Empty path */
39.    myStackExContainer.push (init);
40.    myStackExContainer.run ( );
41. }
```

In the above example, in lines 1 and 2 the classes of node and edge are declared. Further, global variables for keeping track of the current best path and the current best path length are defined in lines 3 and 4.

Lines 5-12 include instructions for the class path, lines 13-33 include instructions for a method to process a path, and lines 34-39 includes instructions for the main method. As shown in line 5, the class path extends the executable object class. However, similar to the previous example, in the class path (lines 5-12), instructions are added to keep track of the list of edges in the path (line 6), the list of edges that do not belong to the path (line 7), the current path length (line 8), and a lower bound for the size of the path (line 9). The class path (lines 5-12) also includes an instruction to add an edge to the current path (line 10). Line 11 is a call to the method to process the executable container.

The method to process the path in the example is in lines 15-35. As shown in lines 15-35, the method to process the path is substantially the same as the method to serially process the path in the previous example. Specifically, as shown, the only change is in line 30 in which rather than adding new paths to a stack, new paths are added to the executable container object. Thus, the new paths may be processed in parallel in accordance with one or more embodiments of the invention.

The main method (lines 34-40) also includes minor changes from the serial version. Specifically, in line 36, an instruction to instantiate a new executable container is created. However, like the serial version, an empty path is created (line 37). However, rather than adding the empty path to a stack, the empty path is added to the executable container (line 38). In line 39, the executable container is run. As shown in the examples above, with minimum changes, a developer may create an application in which objects are processed concurrently, with minimum changes.

Figure 6A:
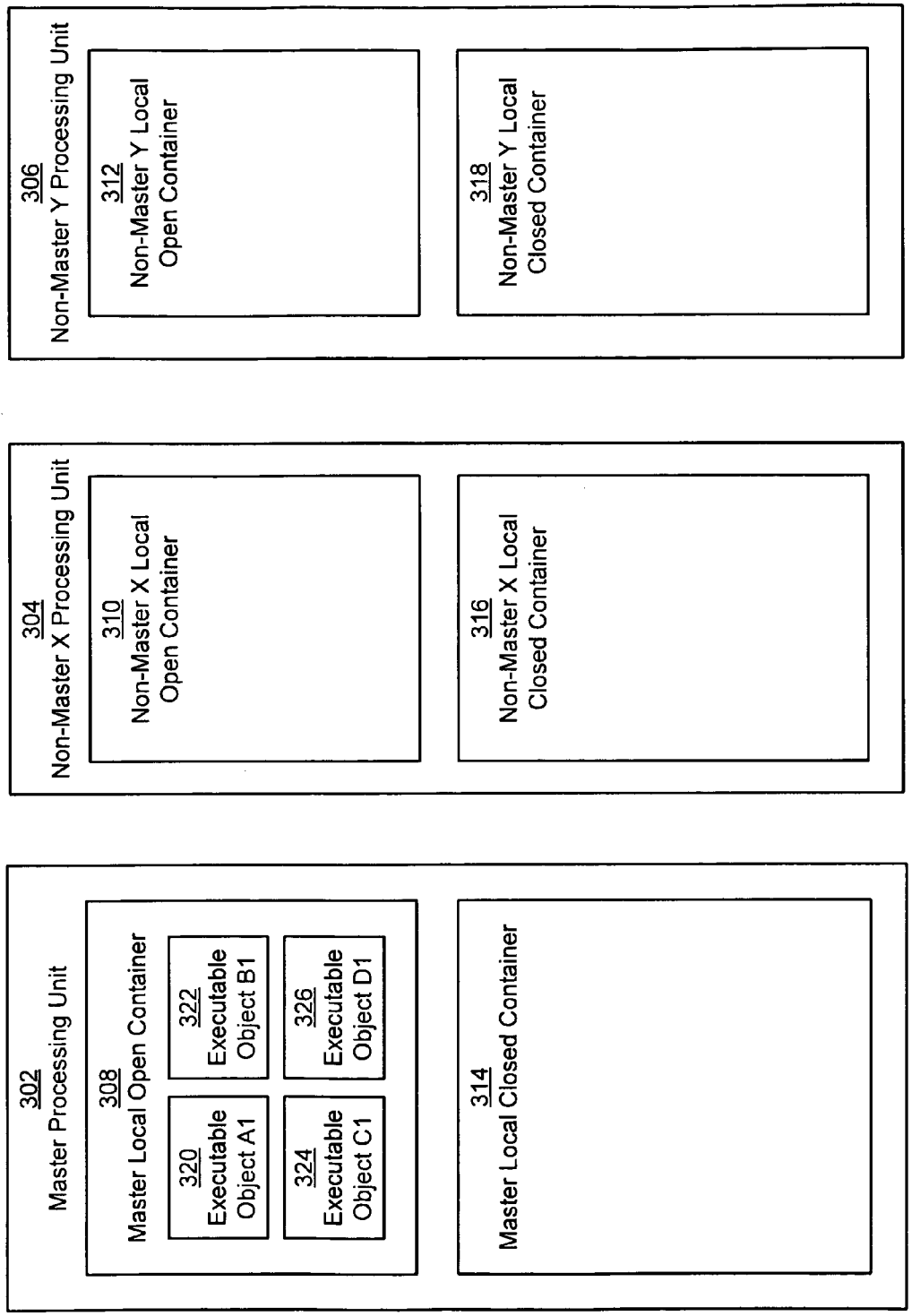
FIGS. 6A-6D show an example in accordance with one or more embodiments of the invention.

FIGS. 6A-6D show another example in accordance with one or more embodiments of the invention. The example below is for explanatory purposes only and not intended to limit the scope of the invention. Specifically, FIGS. 6A-6D show an example of how executable containers may process objects in accordance with one or more embodiments of the invention. As shown in FIG. 6A, consider the scenario in which an application has three processing units (i.e., master processing unit (302), non-master X processing unit (304), non-master Y processing unit (306)). Each processing unit (302, 304, 306) has a local open container (i.e., master local open container (308), non-master X local open container (310), non-master Y local open container (312)), and a local closed container (i.e., master local open container (308), non-master X local open container (310), non-master Y local open container (312)).

As shown in FIG. 6A, when the CEE is first executed, all of the executable objects (i.e., executable object A1 (320), executable object B1 (322), executable object C1 (324), executable object D1 (326)) are in the master local open container (308). In FIG. 6A, three threads, one for each processing unit (302, 304, 306) start executing.

Figure 6B:
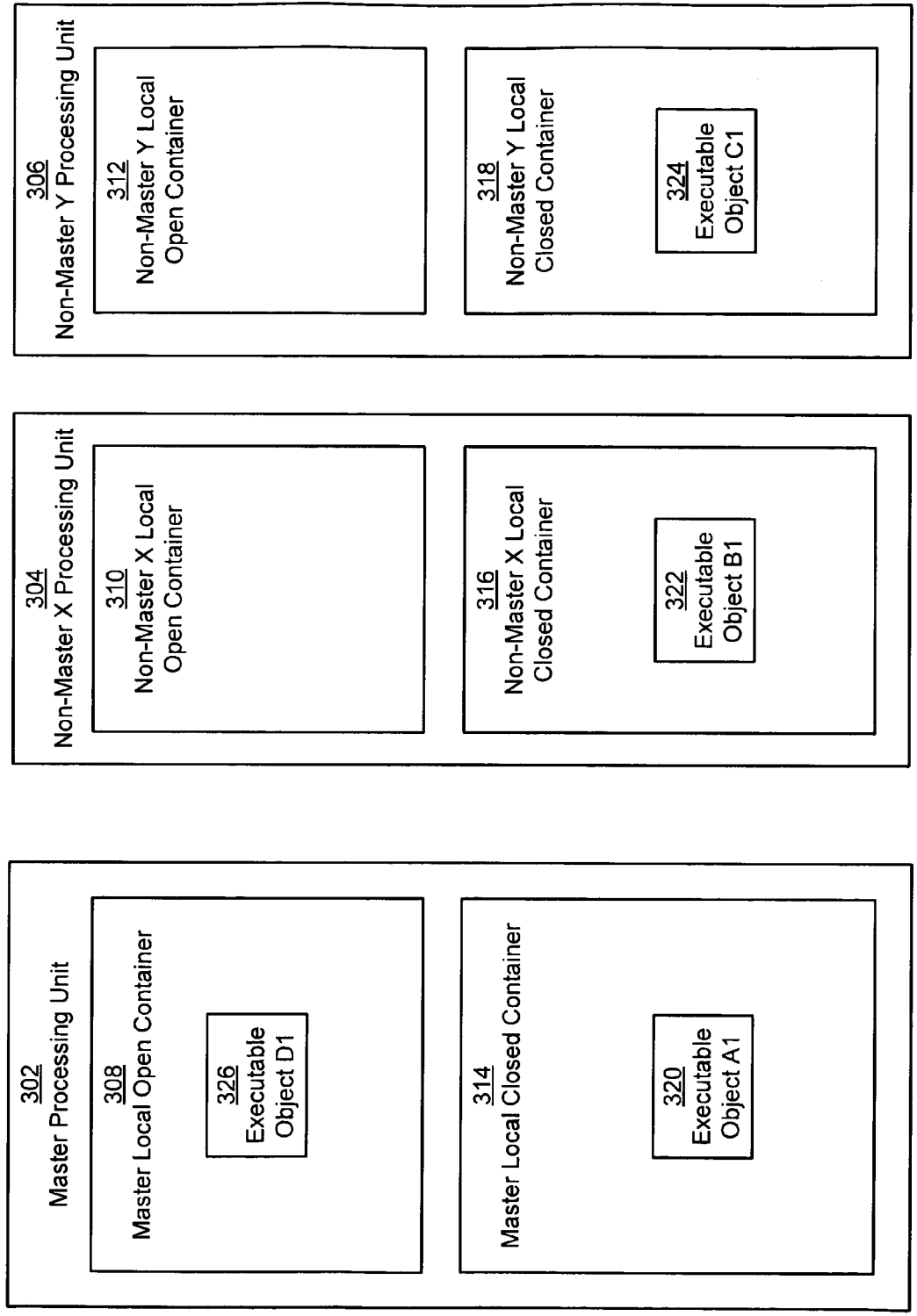

FIG. 6B shows the example of how different threads may obtain executable objects. As shown in FIG. 6B, the master thread associated with the master processing unit (302) may process executable object A1 (320). Accordingly, executable object A1 (320) may be associated with the master local closed container (314). Similarly, non-master thread X associated with non-master X processing unit (304) may process executable object B1 (322). Accordingly, executable object B1 (322) may be associated with the non-master X local closed container (316). Finally, non-master thread Y associated with non-master Y processing unit (306) may process executable object C1 (324). Accordingly, executable object C1 (324) may be associated with the non-master Y local closed container (318). Because all threads are processing executable objects, executable object D1 (326) may remain in the master local open container (308).

Figure 6C:
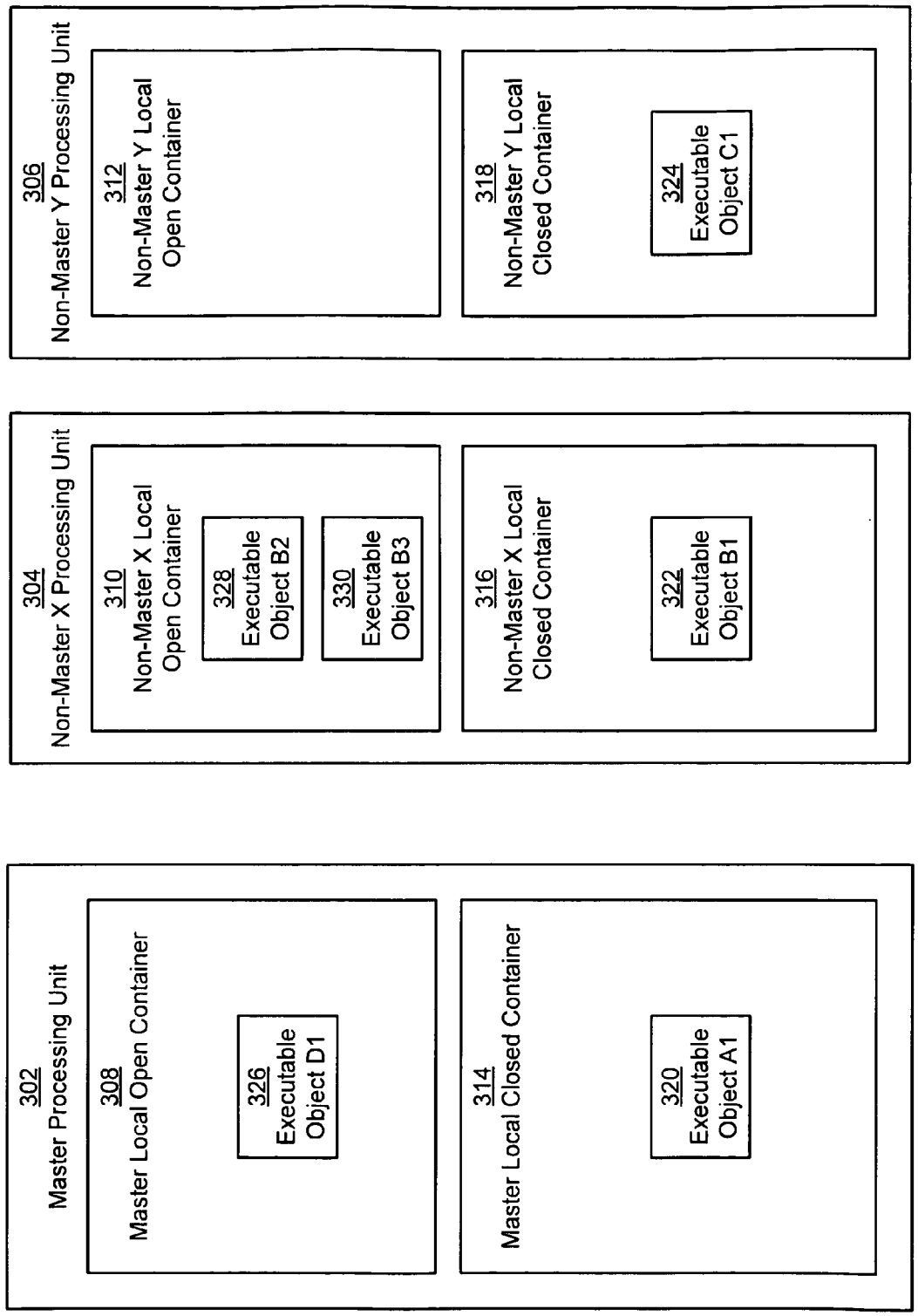

Continuing in the example with FIG. 6C, consider the scenario that while processing executable object B1 (322), thread X creates two new executable objects (i.e., executable object B2 (328), executable object B3 (330)). In one or more embodiments of the invention, the new executable objects (328, 330) are associated with non-master X local open container (310) as shown in FIG. 6C. Thus, the executable objects that are not yet processed (326, 328, 330) wait in the local open containers (308, 310) to be processed.

Figure 6D:
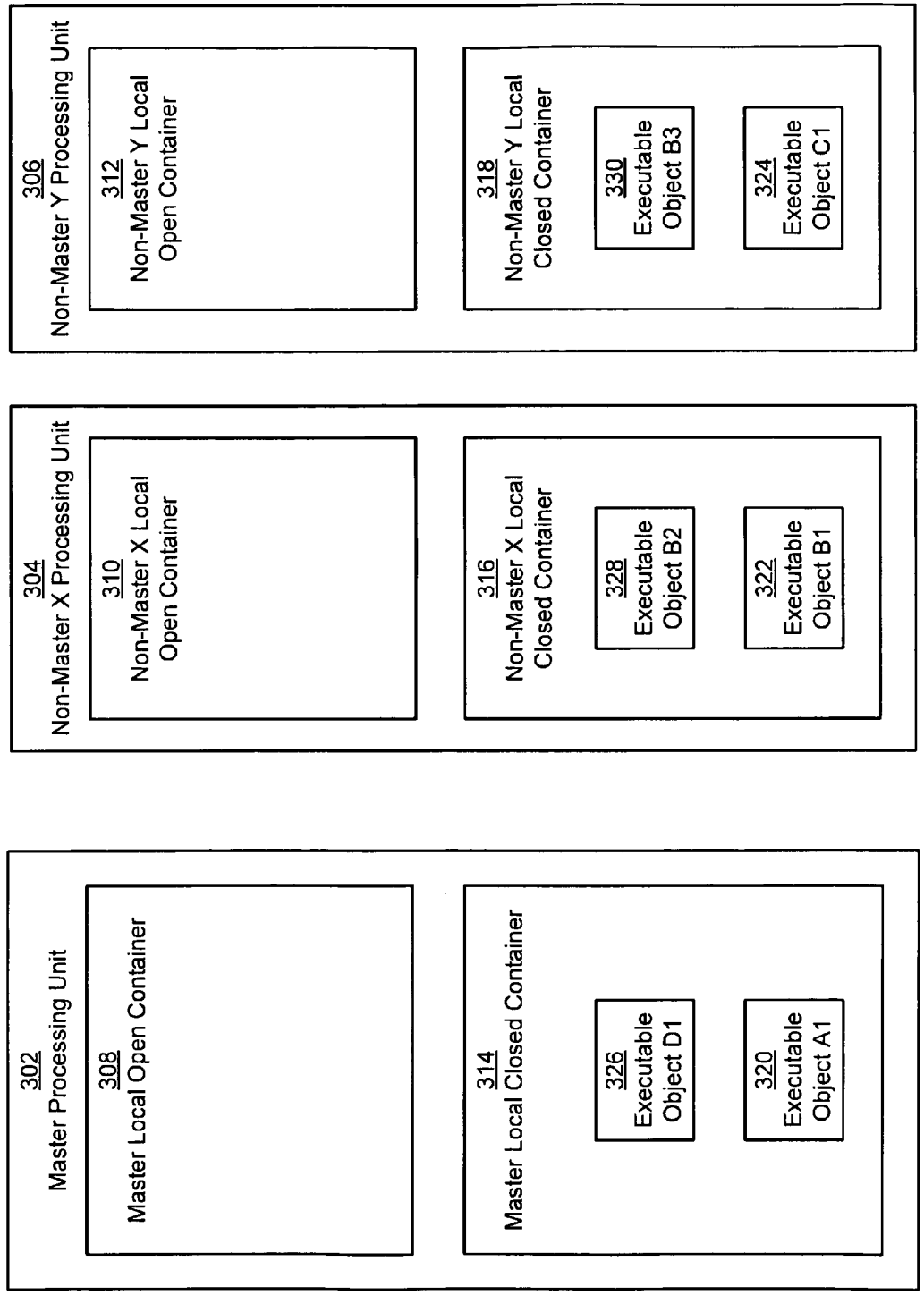

Continuing with the example, FIG. 6D shows an example of how the processing of the executable objects may complete. Specifically, as shown in FIG. 6D, the master thread next processes executable object D1 (326) because executable object D1 (326) is in its local open container (308). Likewise, the non-master thread X next processes executable object B2 (328) because executable object B2 (328) is in its local open container (310). However, because non-master thread Y does not have an executable object in its local open container, non-master thread Y obtains executable object B3 (330) from non-master X local open container (310) and processes executable object B3 (330). Thus, executable object D1 (328) is associated with master local closed container (314), executable object B2 (330) is associated with non-master X local closed container (316), and executable object B3 (330) associated with non-master Y local closed container (318). When the processing of executable objects completes, thread X and thread Y may be destroyed and the master thread may continue processing the application.

Embodiments of the invention allow a developer to easily define how an application can be executed concurrently. In particular, the serial source code may only be modified slightly to allow the executable code to execute concurrently. For example, the developer may only need to include a statement that the object which the developer would require in a serial program extends the executable object class, and a statement that adds the executable object to the executable container object.

In another example, in one or more embodiments of the invention, the developer does not need to understand how to implement the application to satisfy dependency constraints. Rather, the developer may simply create a conditional object that defines the dependencies. The library and the library ensure that the execution of the executable objects in the application complies with the conditions defined by the developer. As shown by the above examples, with limited knowledge of parallel programming, a developer may create an application having multiple threads, which execute concurrently.

Figure 7:
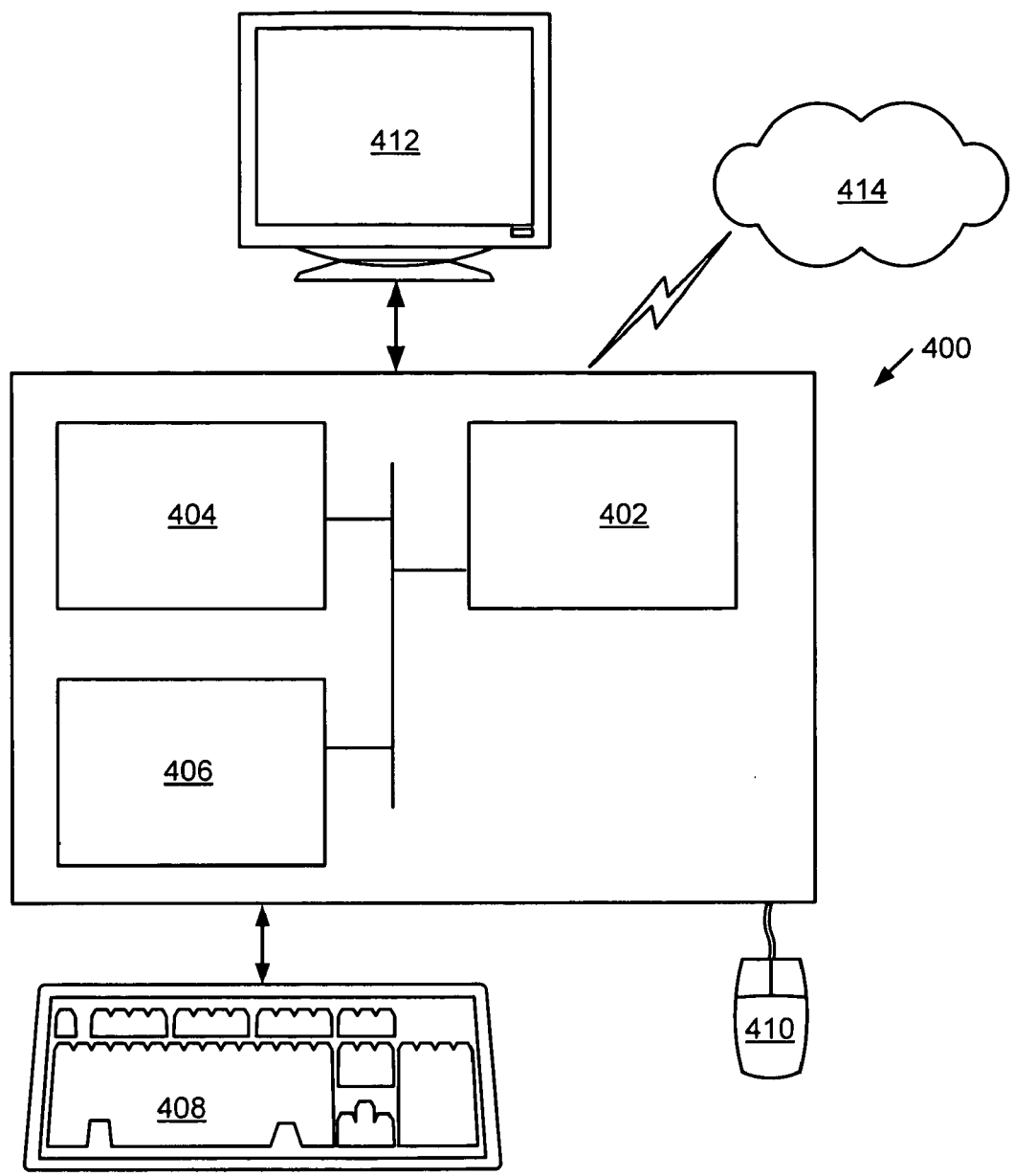
FIG. 7 shows a computer system in accordance with one or more embodiments of the invention.

Embodiments of the invention may be implemented on virtually any type of computer regardless of the platform being used. For example, as shown in FIG. 7, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., processing devices, non-master processing unit, master processing unit, source code, executable code, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing an application in parallel, comprising:
    instantiating, by a first thread, a first executable object and a second executable object;
    creating a first processing unit corresponding to the first thread, wherein the first processing unit is a run-time data structure for tracking at least the first executable object and the second executable object;
    instantiating an executable container object, wherein only executable objects within the executable container object may be executed concurrently;
    spawning a second thread;
    creating a second processing unit corresponding to the second thread;
    associating the first executable object and the second executable object with the executable container object, wherein associating the first executable object and the second executable object with the executable container object designates the first executable object and the second executable object for parallel execution;
    processing the executable container object to generate a result, wherein processing the executable container object comprises:
        inserting the first executable object and the second executable object into a local open container of the first processing unit, wherein a local open container is a run-time data structure that is a type of executable container object for tracking executable objects that have not been processed or that are partially processed;
        processing, using a first hardware processing device, the first executable object by the first thread;
        detecting that a local open container of the second processing unit is empty;
        moving, while processing the first executable object and in response to detecting that the local open container of the second processing unit is empty, the second executable object from the local open container of the first processing unit to the local open container of the second processing unit; and
        processing, using a second hardware processing device, the second executable object by the second thread in parallel with the first executable object,
        wherein the first thread processes executable objects associated with the first processing unit,
        wherein the second thread processes executable objects associated with the second processing unit, and
    wherein the first thread and the second thread execute in parallel; and storing the result.

2. The method of claim 1, wherein the processing of the second executable object by the second thread spawns a third executable object.

3. The method of claim 2, wherein the third executable object is associated with the local open container of the second processing unit.

4. The method of claim 2, wherein processing the executable container object further comprises:
    spawning a third thread;
    identifying the third executable object in the local open container of the second processing unit;
    dissociating the third executable object from the local open container of the second processing unit;
    associating the third executable object with a third processing unit of the third thread; and
    processing the third executable object by the third thread.

5. The method of claim 4, wherein processing the third executable object is conditioned on completing processing of a fourth executable object.

6. The method of claim 5, further comprising:
    changing a state of the fourth executable object, wherein the state is stored in a public bulletin; and
    accessing, by the third thread, the public bulletin to identify the state of the fourth executable object,
    wherein the third executable object is processed after the identified state indicates that the processing of the fourth executable object is complete.

7. The method of claim 2, wherein processing the executable container object further comprises:
    comparing the third executable object to a fourth executable object to determine whether the fourth executable object is superior to the third executable object; and
    processing the third executable object based on an intermediate result obtained from processing the fourth executable object, wherein the fourth executable object is superior to the third executable object.

8. The method of claim 7, wherein comparing the third executable object to the fourth executable object is performed by an object inspection service.

9. The method of claim 2, wherein processing the executable container object further comprises:
    comparing the third executable object to a fourth executable object to determine whether the third executable object is superior to the fourth executable object, wherein the third executable object is generated after the fourth executable object, and wherein the fourth executable object is unprocessed; and
    deleting the fourth executable object based on the third executable object being superior to the fourth executable object.

10. The method of claim 9, wherein comparing the third executable object to the fourth executable object is performed by an object deletion service.

11. The method of claim 1, wherein the executable container implements an ordering for processing executable objects.

12. The method of claims 11, wherein the ordering is based on a type of the executable container, wherein the type of executable container is one selected from a group consisting of a queue, a priority queue, a stack, and a pool.

13. The method of claim 1, further comprising:
    combining, by a reduction service, a first intermediate result with a second intermediate result to generate the result,
    wherein the first intermediate result is obtained from processing the first executable object, and
    wherein the second intermediate result is obtained from processing the second executable object.

14. A method for executing an application in parallel, comprising:

instantiating, by a first thread, a first executable object;
instantiating an executable container object, wherein only executable objects within the executable container object may be executed concurrently;
creating a first processing unit corresponding to the first thread, wherein the first processing unit is a run-time data structure for tracking executable objects;
spawning a second thread;
creating a second processing unit corresponding to the second thread;
associating the first executable object with the executable container object, wherein associating the first executable object with the executable container object designates the first executable object for parallel execution;
processing the executable container object to generate a result, wherein processing the executable container object comprises:
 inserting the first executable object into a local open container of the first processing unit, wherein a local open container is a run-time data structure that is a type of executable container object for tracking executable objects that have not been processed or that are partially processed;
 processing, using a first hardware processing device, the first executable object by the first thread;
 generating, while processing the first executable object, a second executable object;
 inserting the second executable object into the local open container of the first processing unit;
 detecting that a local open container of the second processing unit is empty;
 moving, while processing the first executable object and in response to detecting that the local open container of the second processing unit is empty, the second executable object from the local open container of the first processing unit to the local open container of the second processing unit; and
 processing, using a second hardware processing device, the second executable object by the second thread in parallel with the first executable object,
 wherein the first thread processes executable objects associated with the first processing unit,
 wherein the second thread processes executable objects associated with the second processing unit, and
wherein the first thread and the second thread execute in parallel concurrently; and storing the result.

15. The method of claim 14, wherein the processing of the second executable object by the second thread generates a third executable object.

16. The method of claim 15, wherein processing the executable container object further comprises:
 spawning a third thread;
 identifying the third executable object in the local open container of the second processing unit;
 dissociating the third executable object from the local open container of the second processing unit;
 associating the third executable object with a third processing unit of the third thread; and
 processing the third executable object by the third thread.

17. The method of claim 16, further comprising:
 changing a state of a fourth executable object, wherein the state is stored in a public bulletin; and
 accessing, by the third thread, the public bulletin to identify the state of the fourth executable object,
 wherein the third executable object is processed after the identified state indicates that the processing of the fourth executable object is complete,
 wherein processing the third executable object is conditioned on completing processing of the fourth executable object.

18. The method of claim 15, wherein processing the executable container object further comprises:
 comparing the third executable object to a fourth executable object to determine whether the fourth executable object is superior to the third executable object; and
 processing the third executable object based on an intermediate result obtained from processing the fourth executable object, wherein the fourth executable object is superior to the third executable object.

19. The method of claim 15, wherein processing the executable container object further comprises:
 comparing the third executable object to a fourth executable object to determine whether the third executable object is superior to the fourth executable object, wherein the third executable object is generated after the fourth executable object, and wherein the fourth executable object is unprocessed; and
 deleting the fourth executable object based on the third executable object being superior to the fourth executable object.

20. A non-transitory computer readable storage medium comprising computer readable program code embodied therein for causing a computer system to execute an application by:
 instantiating, by a first thread, a first executable object and a second executable object;
 creating a first processing unit corresponding to the first thread, wherein the first processing unit is a run-time data structure for tracking at least the first executable object and the second executable object;
 instantiating an executable container object, wherein only executable objects within the executable container object may be executed concurrently;
 spawning a second thread;
 creating a second processing unit corresponding to the second thread;
 associating the first executable object and the second executable object with the executable container object, wherein associating the first executable object and the second executable object with the executable container object designates the first executable object and the second executable object for parallel execution;
 processing the executable container object to generate a result, wherein processing the executable container object comprises:
  inserting the first executable object and the second executable object into a local open container of the first processing unit, wherein a local open container is a run-time data structure that is a type of executable container object for tracking executable objects that have not been processed or that are partially processed;
  processing the first executable object by the first thread;
  detecting that a local open container of the second processing unit is empty;
  moving, while processing the first executable object and in response to detecting that the local open container of the second processing unit is empty, the second executable object from the local open container of the first processing unit to the local open container of the second processing unit; and
  processing the second executable object by the second thread in parallel with the first executable object, wherein the first thread processes executable objects associated with the first processing unit,
wherein the second thread processes executable objects associated with the second processing unit, and
wherein the first thread and the second thread execute concurrently; and storing the result.

* * * * *